Feb. 26, 1957  P. L. FEAGANS  2,782,691
MACHINE FOR MAKING IMPELLERS
Filed June 17, 1953  7 Sheets-Sheet 1

INVENTOR.
PERRY L. FEAGANS,
BY John H. T. Wallace

Feb. 26, 1957 P. L. FEAGANS 2,782,691
MACHINE FOR MAKING IMPELLERS
Filed June 17, 1953 7 Sheets-Sheet 2

INVENTOR.
PERRY L. FEAGANS,
BY John H.J. Wallace

Feb. 26, 1957  P. L. FEAGANS  2,782,691
MACHINE FOR MAKING IMPELLERS
Filed June 17, 1953  7 Sheets-Sheet 4

INVENTOR.
PERRY L. FEAGANS,
BY

Feb. 26, 1957 P. L. FEAGANS 2,782,691
MACHINE FOR MAKING IMPELLERS
Filed June 17, 1953 7 Sheets-Sheet 5

INVENTOR.
PERRY L. FEAGANS,
BY John H.T. Wallace

P. L. FEAGANS

2,782,691

MACHINE FOR MAKING IMPELLERS

Filed June 17, 1953

INVENTOR.
PERRY L. FEAGANS,

BY John H. T. Wallace

United States Patent Office 2,782,691
Patented Feb. 26, 1957

2,782,691
MACHINE FOR MAKING IMPELLERS

Perry L. Feagans, Los Angeles, Calif., assignor to The Garrett Corporation, Los Angeles, Calif., a corporation of California Application June 17, 1953, Serial No. 362,357

10 Claims. (Cl. 90—13)

This invention relates to metal working machines and more particularly to a milling machine for manufacturing bladed wheels such as those used in various fluid driven or driving devices such as turbines, pumps and the like.

Machines of special design have been created for the sole purpose of manufacturing skew bladed wheels, but these machines are expensive and are not versatile.

It is an object of this invention to provide a skew blade machining attachment for a conventional duplicating milling machine which may be used to increase the versatility thereof.

Another object of this invention is to provide a machining attachment for a metal working machine which, by means of a single variable speed motor, controls and co-ordinates several machine carriage mechanisms movable in different directions.

Another object of the invention is to provide a novel means for maintaining precise rotational synchronism of a plurality of rotating members, disposed in axially angular relationship to each other, while one of the rotating members is positively driving the other rotating members.

Another object of the invention is to provide a skew blade machining means which is very versatile in its ability to produce a variety of blade configurations, corresponding to readily changeable forms and templates.

Another object of the invention is to provide a skew blade machining means which is very simple and easy to set up for producing a particular blade configuration.

Another object of the invention is to provide a skew blade machining means which may be readily adapted to gang machining of several bladed wheels, whereby substantial production thereof may be obtained.

A further object of this invention is to provide a skew blade machining means employing very simple and inexpensive accessory tooling for each individual skew blade configuration to be produced.

Further objects and advantages of the invention will appear from the specification and the accompanying drawings in which.

The present invention relates primarily to a machining attachment which may be connected to a conventional milling machine of the type having a multiple-directional carriage mechanism. A machine commonly known as the Keller profile milling machine is an example of the type of milling machine to which the attachment of the present invention may be connected; however, the control arrangement of the present invention may be applied to any multiple carriage mechanism having multiple directional traverse, that is, to a machine whose carriage or bed and spindle may each be traversed in two or more directions.

The machine shown in the drawings is provided with a frame or bed 15 having carriage ways 16 and 17. Movably mounted on these carriage ways is a carriage 18. It traverses the ways 16 and 17 in directions indicated by the arrows "A" in Figs. 1 and 3. The carriage 18 is provided with ways 19 and 20 on which a carriage 21 is movable in the directions indicated by the arrow "B" in Fig. 1. A motorized lead screw 22 is arranged to move the carriage 18 on the ways 16 and 17 while a motorized lead screw 23 is arranged to move the carriage 21 on the ways 19 and 20. The frame 15 is provided with vertically disposed ways 24 on which a carriage 25 is vertically actuated by means of a motorized screw 26 shown in Fig. 3. A rotating cutter 27 is operated by a cutter motor 28 supported on the carriage 25. Also supported on the carriage 25 are electrical feeler switches 29 and 30.

All of the foregoing structure is common to a conventional profile or die sinking milling machine.

Figures 1, 2, 17:
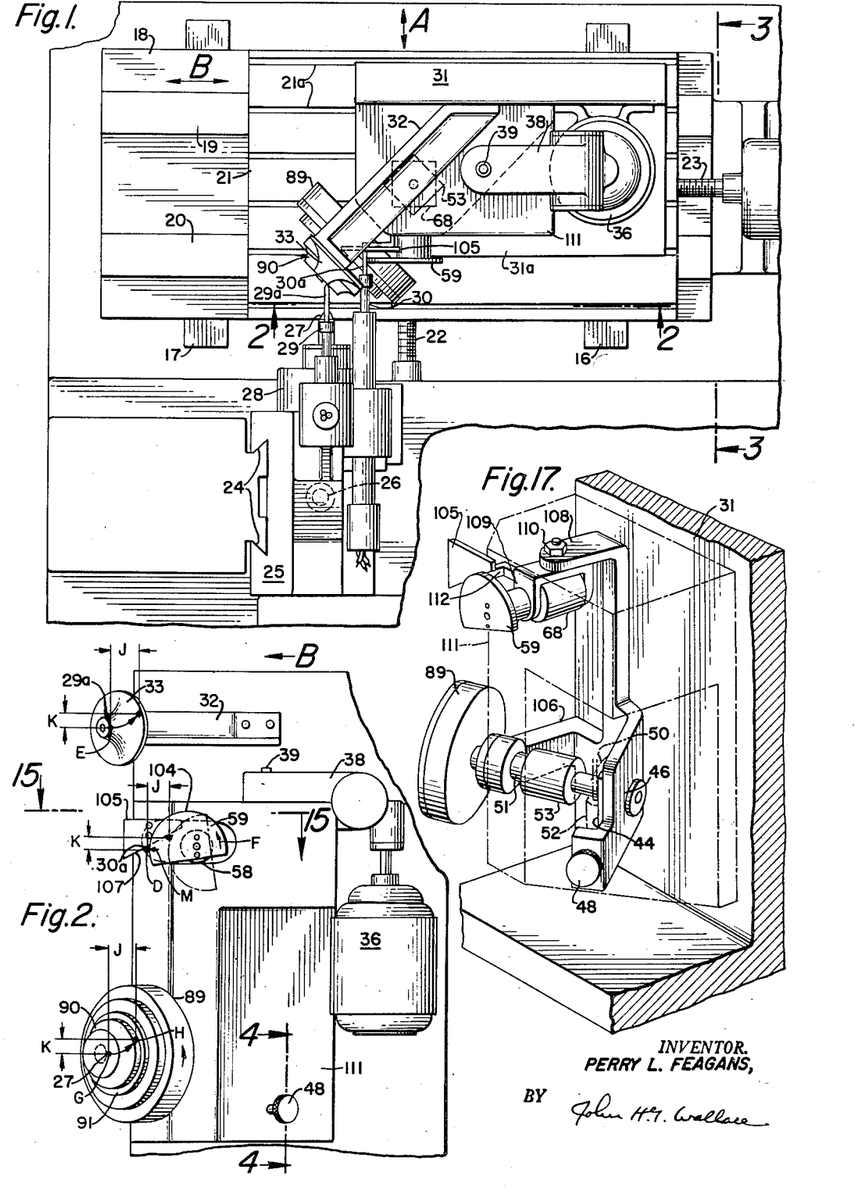
Fig. 1 is a fragmentary top plan view of a conventional milling machine having a skew blade machining attachment in accordance with the present invention.
Fig. 2 is a partial sectional view taken from the line 2—2 of Fig. 1, showing diagrammatically the operative relationship of various components of the skew blade machining attachment.
Fig. 17 is a perspective view showing the relationship of the chuck spindle to the master pattern spindle, including one of the auxiliary patterns and mode of angular adjustment of the master pattern spindle.
Figure 13:
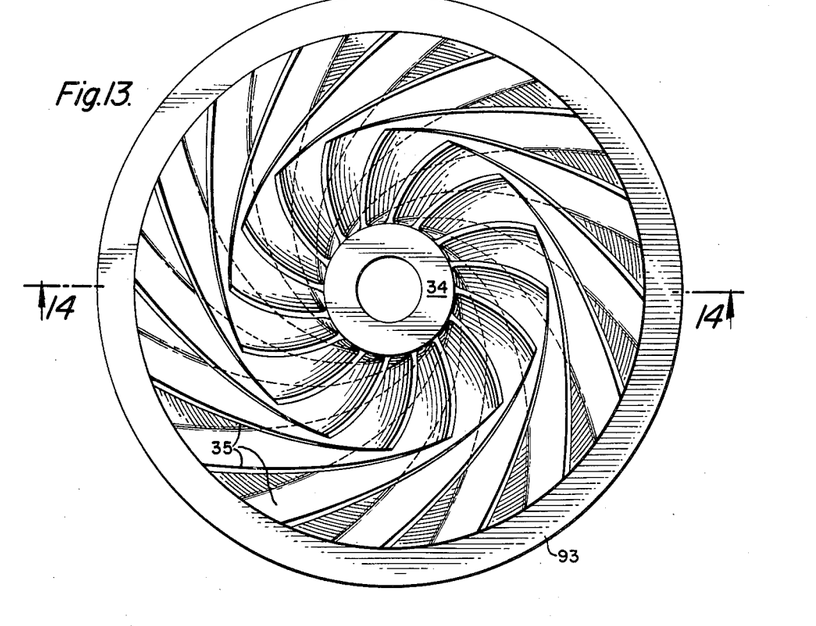
Fig. 13 is an end elevation of a skew-bladed wheel manufactured by the machine in accordance with the invention.
Figure 14:
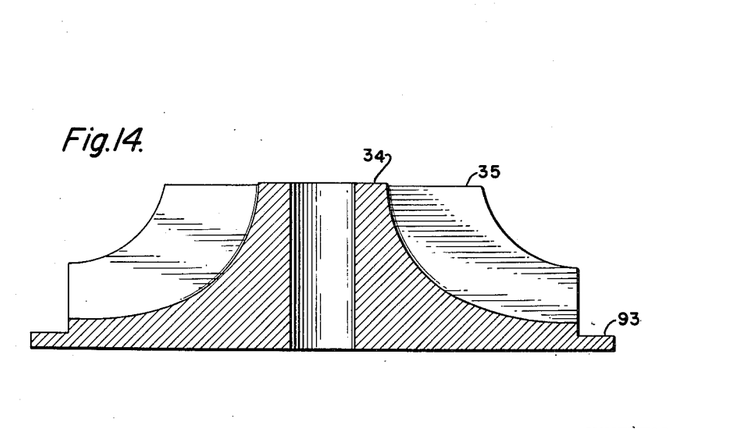
Fig. 14 is a sectional view taken from the line 14—14 of Fig. 13 showing an axial cross section of the bladed wheel.

Mounted on the carriage 21 is an upright angle plate 31 which is normally fixed to the carriage 21 but may be adjusted relative thereto as desired. Fixed to the angle plate 31 by means of a bracket 32 is an auxiliary pattern 33 which co-operates with feeler 29a as shown in Fig. 1. The auxiliary pattern 33 is contoured to match the hub of the bladed wheel shown in Figs. 13 and 14. The cross sectional shape of the wheel as shown in Fig. 14 discloses the hub portion 34 which is integral with the root portion of the blades 35, the auxiliary pattern 33 matching the hub of the impeller wheel at the root portion of the blades 35. It will be understood that the particular contour shape of the auxiliary pattern 33 may be varied to provide various wheel figurations as desired.

The feeler 29a acting in cooperative relationship with the auxiliary pattern 33 senses the form contour by axial pressure on the feeler 29a which actuates the feeler switch 29. The switch 29 controls operation of the motorized screw 22 which, in turn, actuates the carriage 18 in the directions indicated by the arrows "A". A motor 36 is mounted on the angle plate 31 as will be hereinafter described. The motor 36 may be electric, hydraulic, pneumatic or any equivalent thereof. The motor 36, by means of its shaft 37, operates the reduction gear mechanism 38. The reduction gear mechanism is provided with an output shaft 39 which is connected by means of a universal joint 40 to a shaft 41, the shaft 41 being journaled in bearings 42 and 43 carried by the plate 44 which is pivotally mounted on a pin 45 as shown best in Fig. 4.

Figure 4:
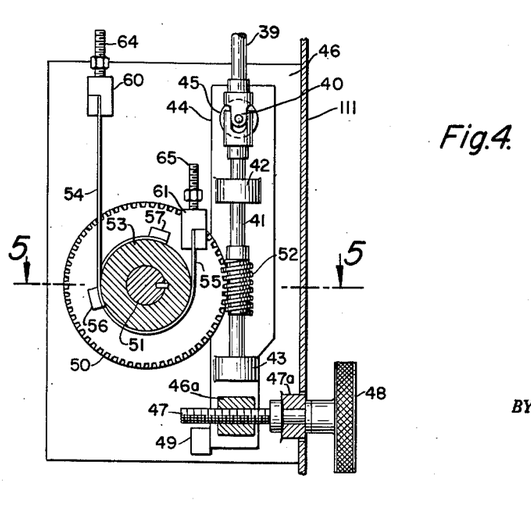
Fig. 4 is an enlarged fragmentary sectional view taken from the line 4—4 of Fig. 2.
Figures 5, 6:
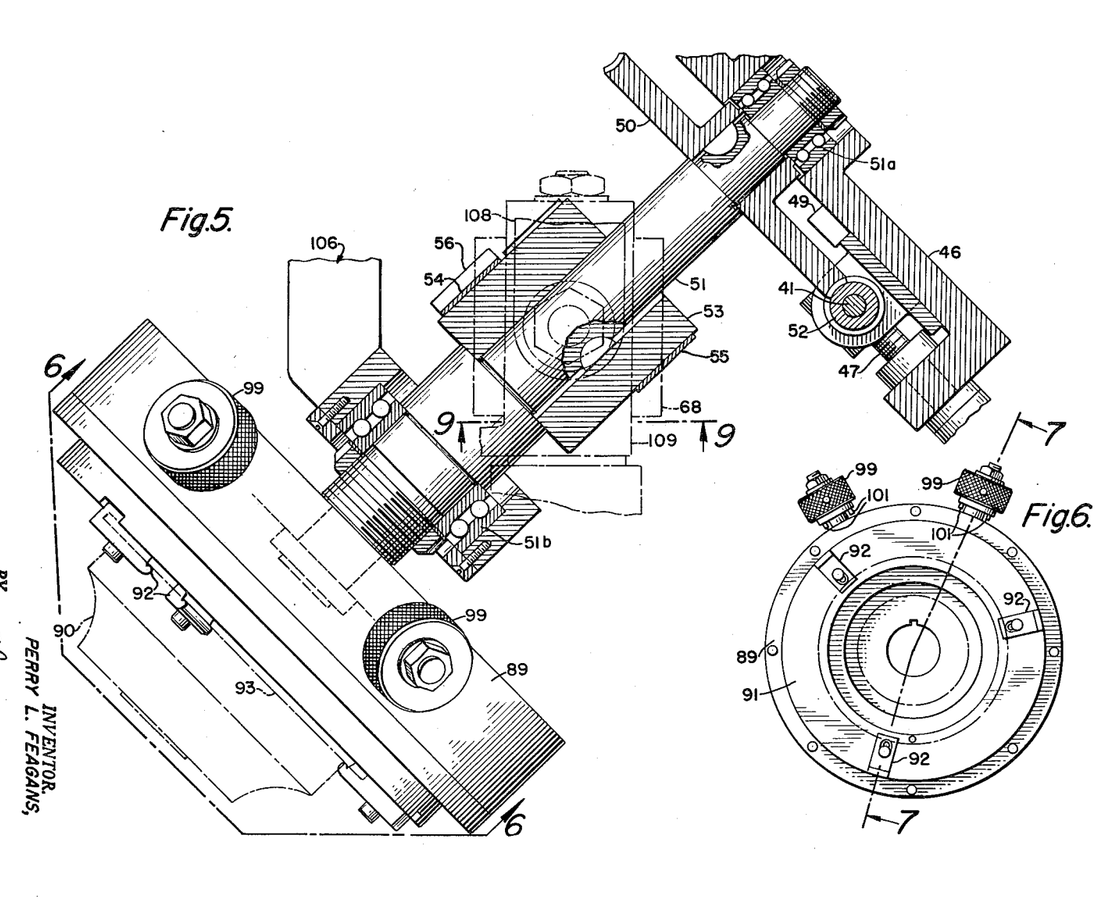
Fig. 5 is an enlarged fragmentary sectional view taken from the line 5—5 of Fig. 4 showing portions in elevation to facilitate their illustration and further showing, by broken lines, the superimposed relationship of structure above the plane of the section.
Fig. 6 is a reduced end view of the work-holding chuck taken from the line 6—6 of Fig. 5.

The pin 45 is supported by the arm 46 of bracket 106 which in turn is secured to the angle plate 31. Pivotally mounted to the plate 44 is a nut 46a threadably engaged with a manually operated screw 47 which is supported in a bearing 47a connected with the arm 46. The screw 47 is provided with a control knob 48 arranged for manual rotation thereof for pivoting the plate 44 about the axis of the pin 45. Secured to the arm 46 is a stop member 49 adapted to limit the pivotal movement of the plate 44 toward a worm gear 50 which is carried by a chuck spindle 51. Fixed to the shaft 41 is a worm 52 arranged to mesh with the worm gear 50 as shown in Figs. 4 and 5. Fixed on the chuck spindle 51 is a drum 53 to which metallic straps 54 and 55 are connected; as shown in Figs. 4, 9, and 10; these straps 54 and 55 are spaced axially on the drum 53 and are secured thereto by blocks 56 and 57 which are fixed to the drum 53 by means of screws.

Figures 9, 12:
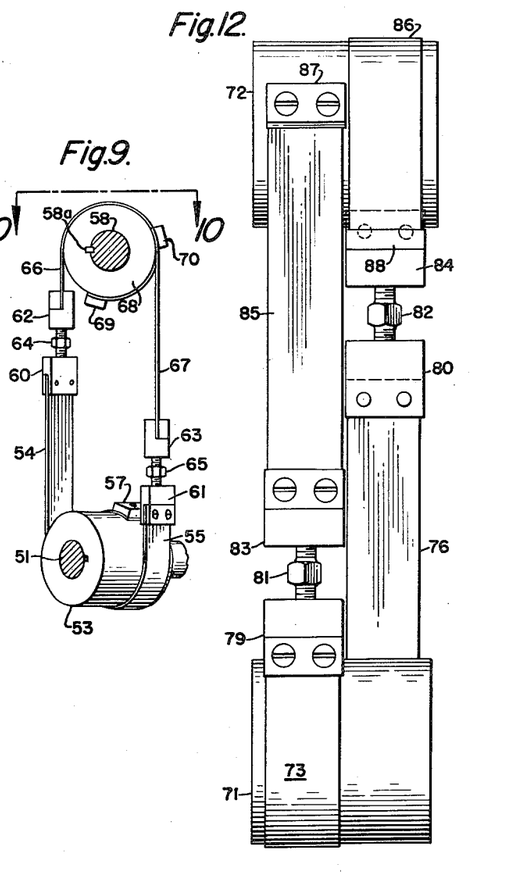
Fig. 9 is a reduced sectional view taken from the line 9—9 of Fig. 5 showing the drive mechanism which synchronizes operation of the work-holding chuck and master pattern of the skew blade machining attachment.
Fig. 12 is another view of the modified form as shown in Fig. 11 and is disposed in a plane rotated 90° relative thereto.
Figure 10:
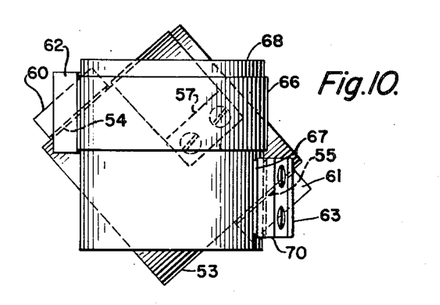
Fig. 10 is an enlarged top or plan view taken from the line 10—10 of Fig. 9.
Figure 16:
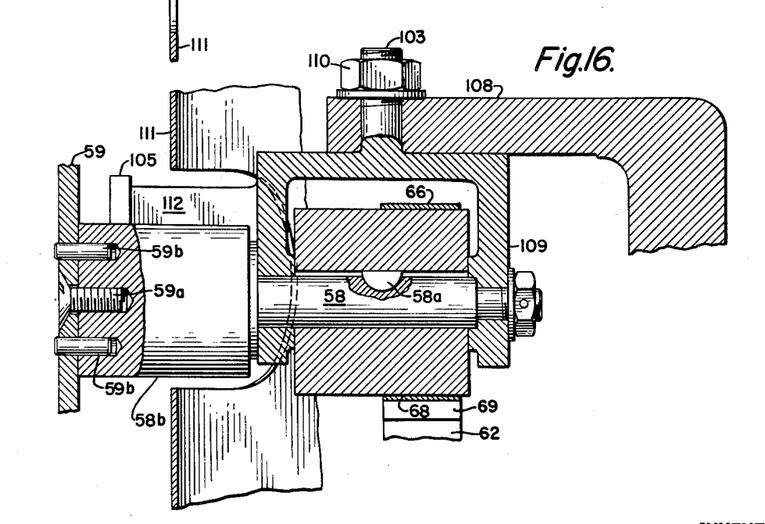
Fig. 16 is a sectional view taken from the line 16—16 of Fig. 15.

As shown particularly in Figs. 9 and 16 master pattern spindle 58 is positioned above and in spaced relationship to the chuck spindle 51 and is angularly disposed with respect to the axis of the spindle 51 in order to provide co-operative relationship of a master pattern 59 and the feeler 30a. The axis of the feeler is substantially parallel to the spindle 58 on which the master pattern 59 is mounted. As shown in Fig. 9, clamp blocks 60 and 61 are secured to the clamp blocks 62 and 63 by threaded connectors 64 and 65, respectively. These screw-threaded connectors 64 and 65 are right- and left-hand screws to provide flexibility in connecting the straps 54 and 55 with straps 66 and 67, respectively, which are secured to a drum 68 by means of blocks 69 and 70, respectively. The drum 68 is fixed to the spindle 58 by a key 58a. These blocks 69 and 70 are fixed to the drum 68 by screws projecting through the blocks and into the drum. As shown in Fig. 10, the spacing of the straps 54 and 55, and the straps 66 and 67, longitudinally of the axis of the drums 53 and 68, is proportional to the angular relationship of these drums 53 and 68. The screw-threaded connectors 64 and 65 are tightened sufficiently to provide tension in the straps 54, 55, 66, and 67. The synchronizing strap mechanism, as shown in Figs. 9 and 10 is operable to accomplish the spindle rotation through a desired angle.

Figure 11:
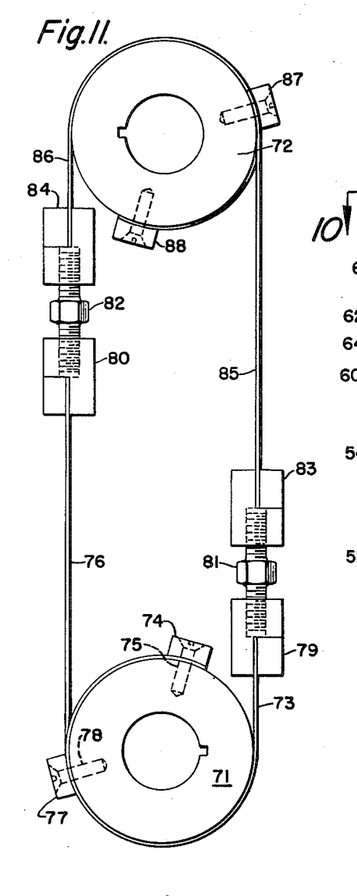
Fig. 11 is a side view of a modification of the structure shown in Fig. 9.

The modified spindle synchronizing mechanism shown in Figs. 11 and 12 is also operable to rotate the spindle through less than a full revolution. The spindle synchronizing strap mechanism of Figs. 11 and 12 is arranged to operate in connection with spindles which have axes disposed parallel with each other. As shown in Fig. 11 a drum 71 corresponds to the drum 53, shown in Fig. 9, while a drum 72, of Fig. 11, corresponds to the drum 68. A strap 73 is fixed to the drum 71 by means of a block 74 and screws 75. The strap 76 is fixed to the drum 71 by means of a block 77 and screws 78. Clamp blocks 79 and 80 connect the straps 73 and 76 to screw-threaded connectors 81 and 82. Screw-threadedly connected to these connectors 81 and 82 are clamp blocks 83 and 84. The clamp blocks 83 and 84 are secured to straps 85 and 86 which are connected to the drum 72 by means of blocks 87 and 88, respectively.

Figure 7:
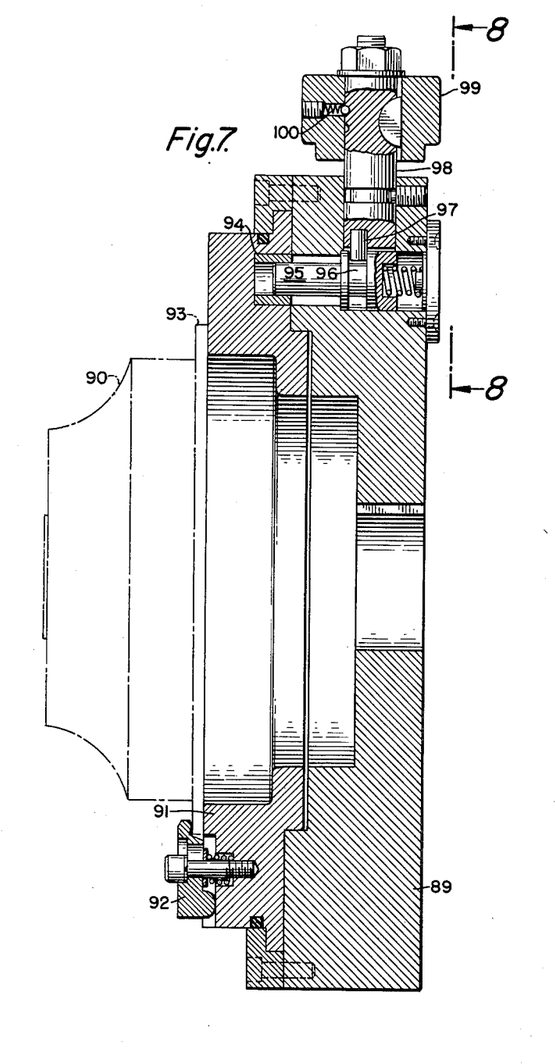
Fig. 7 is an enlarged sectional view taken from the line 7—7 of Fig. 6 showing by dash lines the disposition of a work piece held in the chuck and illustrating portions in elevation to facilitate the illustration.

As shown in Fig. 5 the spindle 51 supports a chuck 89 in which the workpiece 90 is carried during machining of a bladed wheel therefrom. The chuck 89 as shown particularly in Fig. 7 is provided with a rotatable plate 91 carrying clamp members 92 which engage the flange 93 of the workpiece 90 for holding the same securely in the chuck 89. The plate 91 is provided with a plurality of index bushings 94 engageable by index pin 95 for precisely setting the workpiece 90 relative to the cutter 27 for machining each individual blade of a bladed wheel in its proper spaced relationship to adjacent blades.

Figure 8:
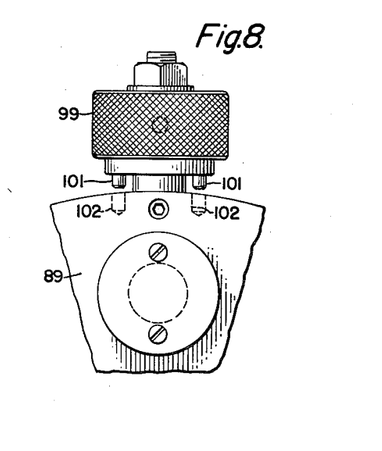
Fig. 8 is a fragmentary elevational view taken from the line 8—8 of Fig. 7.

The indexing pin 95 is provided with an annular groove 96 engaged by an eccentric pin 97 on an actuator shaft 98, which is provided with a knurled head 99 which may be manually operated to rotate the actuator shaft 98 for shifting the index pin 95 by means of the eccentric pin 97 into and out of engagement with a desired index bushing 94. The head 99 is axially movable on the shaft 98 and is provided with a detent 100, adapted to retain the head member in certain fixed positions on the shaft 98, as desired. As shown in Fig. 8, the head 99 is provided with projecting pins 101 engageable with recessed portions 102 in the body of the chuck 89 when the head 99 is pushed down, whereby accidental rotation of the shaft 98 during machining is prevented.

As shown in Fig. 2, the spindle 58 supports the master pattern 59 in certain relationship to the chuck 89. The master pattern 59 is a flat plate having a curved feeler-engaging cam surface 104 eccentrically arranged relative to the axis of the spindle 58. A second auxiliary pattern 105 is supported in fixed relationship to master pattern 59 by means of arm 112 of yoke 109. The second auxiliary pattern 105 is provided with a feeler engaging surface 107 inclined relative to the plane of the carriage 21. The bracket 106 supports the arm 46, together with bearings 51a and 51b journaling the spindle 51. The angle plate 31 supports the motor 36 in fixed relationship to the gear box 38.

Figure 15:
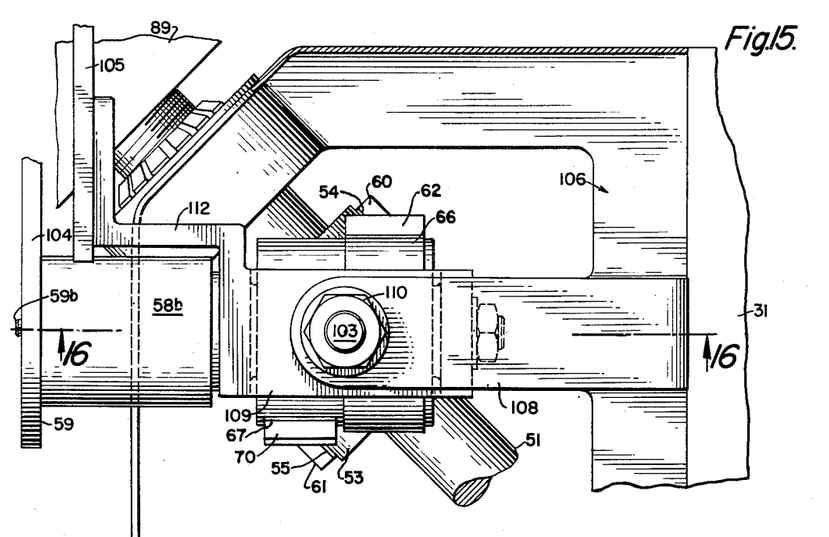
Fig. 15 is an enlarged sectional view taken from the line 15—15 of Fig. 2.

Referring to Figs. 15 and 16 it will be seen that the axes of the spindles 51 and 58 are disposed at an angle. The spindle 51 is supported in fixed relationship to the bracket 106 as hereinbefore described, while the angle of the axis of the spindle 58 is adjustable with respect to that of the spindle 51 by means of a bolt. Bolt 103 extends through an arm 108 of the bracket 106, and fixed to the bolt is a yoke 109 in which the spindle 58 is journaled as shown best in Fig. 16.

The spindle 58 is provided with an enlarged head 58b to which the master pattern 59 is secured by means of a screw 59a and dowels 59b. The bolt 103 is provided with an externally screw threaded portion on which a nut 110 is engaged, and nut 110 is arranged to fix the yoke 109 in certain adjusted positions relative to the arm 108 of the bracket 106.

Figure 3:
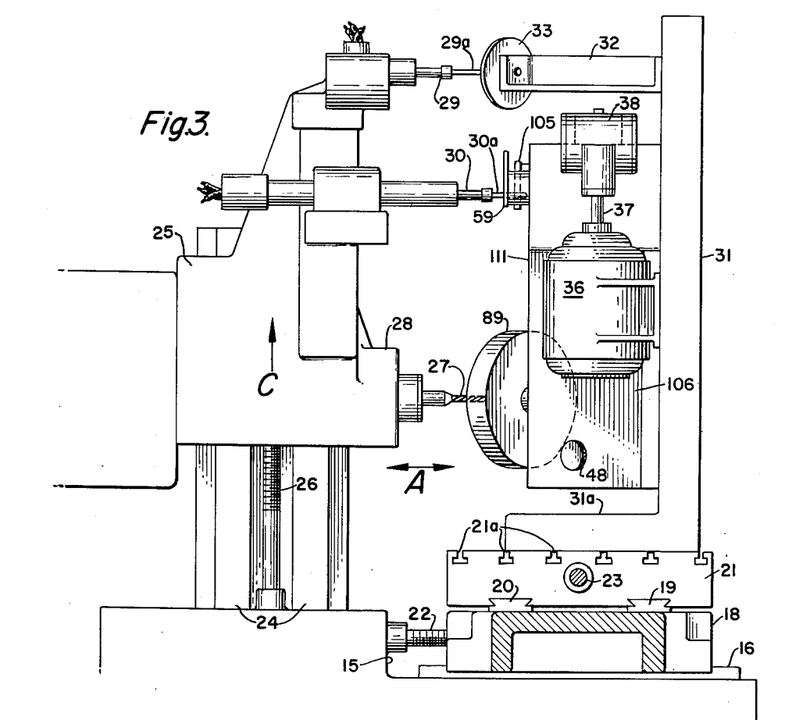
Fig. 3 is a sectional view taken from the line 3—3 of Fig. 1.

As shown in Fig. 3 the carriage 21 is mounted on the ways 19 and 20 and is provided with conventional T slot portions 21a adapted to receive hold-down fixtures for fixing the angle plate 31 thereon. The angle plate 31 is provided with a base portion 31a which may be adjusted on the upper surface of the carriage 21 as desired. For the purpose of adjusting the angular relationship of the axis of the spindle 51 relative to the axis of the cutter 27 the angle plate 31 may be rotated about a vertical axis substantially aligned with the bolt 103 while the axis of the spindle 58 may be maintained parallel with the axis of the feeler 30a by the simple adjustment provided for by the bolt 103 as hereinbefore described.

As shown in Figs. 1 and 2 the spindles 51 and 58 together with the operating mechanism connected thereto are enclosed in a sheet metal casing 111 which protects the mechanism from foreign matter such as metal chips or the like.

The feeler switches 29 and 30 are conventional in profile milling machines and operate to control the various motorized lead screws operating the carriages of the machine. It will be understood that any equivalent carriage movement control devices may be used to accomplish the operation of the switches 29 and 30. The feeler switch 29 is provided with an axially movable feeler 29a which controls the feed of the lead screw 22 for moving the carriage 18 on the ways 16 and 17 in the directions of the arrows "A." The feeler switch 30 is provided with a feeler 30a which is movable laterally of the axis of feeler switch 30 in several directions. It is responsive to vertical movement relative to the surface 107 of the second auxiliary pattern 105 and is also responsive to horizontal movement relative to the cammed surface of master pattern 59. The feeler switch 30 controls the vertical movement of the carriage 25 as indicated by arrow "C" and also the movement of the carriage 21 on the carriage 18 as indicated by the arrows "B."

As shown in Fig. 2 the workpiece 90 supported in the chuck 89 is arranged to be machined into a bladed wheel. At the beginning of a machining operation on a blade of the wheel the cutter 27 is arranged in the position "G," the feeler 30a is arranged in the position "D," and at the same time the feeler 29a is disposed in the position "E." The starting position of the cutter 27 substantially coincides with the starting position of the feeler 29a with respect to the geometry of a bladed wheel to be machined and the geometry of the auxiliary pattern 33.

When operation of the machine is initiated and the motor 36 is energized, the motor 36 by means of the gear box 38 drives the shaft 39 at a considerably reduced speed depending upon the desired feed and cutting speeds. The shaft 39 transmits rotary motion to the worm 52 which is in mesh with the worm gear 50 on the spindle 51 carrying the chuck 89. The chuck 89 thus moves at very low rotational speed, and synchronized with chuck 89 is the spindle 58 driven by the straps 54, 55, 66, and 67, hereinbefore described. The cutter 27 is a straight cutter which revolves at high speed and which is carried on carriage 25 as shown in Fig. 3. During rotation of the spindle 58 the eccentric master pattern 59 moves in a counterclockwise direction as indicated by the arrow "F" in Fig. 2. As the master pattern 59 relieves lateral force on the feeler 30a of the feeler switch 30, the machine motor for actuating the lead screw 23 is energized forcing the carriage 21 in the direction of the arrow "B" as shown in Figs. 1 and 2. As pressure on the feeler 30a is relieved by the master pattern 59 the inclined surface 107 of the stationary second auxiliary pattern 105 relieves vertical tension of the feeler 30a permitting it to move upwardly which cause energization of the motorized element of the machine for actuating the lead screw 26 to raise the carriage 25 upwardly as indicated by the arrow "C" in Fig. 3. While the feeler 30a is sensing horizontal and vertical change and relaying it to the motors for operating respective carriages vertically and horizontally, the feeler 29a of the feeler switch 29 follows the contour of the auxiliary pattern 33 along the same relative path followed by the end of the cutter 27. The feeler switch 29 relays electrical impulses to the motor controlling the operation of the lead screw 22 for adjusting the carriage 18 on the ways 16 and 17 in the directions indicated by the arrows "A" in Figs. 1 and 3. The operation of the lead screws 22, 23, and 26 is substantially concurrent providing a uniform even movement of the cutter 27 from the initial position "G," to the position "H," representing a distance "K," accounted for in vertical movement of the carriage 25, in the direction indicated by the arrow "C" as shown by Fig. 3. A counterclockwise rotation of the master pattern 59, in synchronism with the counterclockwise rotation of the chuck spindle 51 causes at the same time movement of the carriage 21 in the direction of the arrow "B" equal to the distance "J" shown in Fig. 2. Referring to Figs. 13 and 14 it will be seen that the outer ends of the blades 35 appear to be curved. Such curvature is formed by the machining of these blades by a straight cutter disposed at an angle to the axis of the workpiece as shown best in Fig. 1. The surfaces of the blades 35 are straight along the axis of the cutter 27 but due to the compound movement of the chuck, the cutter 27, and the carriage 21, the blades are machined in a skew form as shown in Figs. 13 and 14.

The chuck 89 as hereinbefore described is arranged to permit rotation of the ring 91 for indexing the workpiece 90 in certain positions equal to the spacing between the blades 35 of the wheel as shown in Fig. 13; thus following each blade machining operation the ring 91 is reset with relation to the chuck 89 in the manner previously described so that the cutter 27 will traverse a new path for machining an additional space between adjacent blades. In order to reset the master pattern 59, the worm 52 may be disengaged from the worm gear 50 by rotating the handwheel 48 and pivoting the plate 44 about the axis of the pin 45 as hereinbefore described. When the worm 52 is thus disengaged, spindles 51 and 58 may be freely rotated to substantially the positions shown in Figs. 1 and 2 for the beginning of another blade machining operation. It will be here noted that the master pattern 59 may be provided with an index pointer "M" (Fig. 2) for the purpose of resetting the same at the beginning of each blade machining operation.

For the purpose of machining certain blade configurations it is necessary to replace the patterns 59 and 105 with similar patterns having slight geometrical differences in the feeler contacting cam surfaces thereof in order to accurately machine the opposite sides of the blades as shown in Fig. 13 of the drawing.

Numerous blade configurations may be readily machined by modifying the shape of the auxiliary pattern 33 and of the patterns 59 and 105. It will be obvious that the adjustment of the axis of the spindle 51 relative to the ways 19 and 20 may be resorted to for the purpose of varying the machining geometry of certain blade configurations.

In setting up the machining attachment of this invention on a conventional die-sinking machine, or the like, the unitary mechanism including the spindles 51 and 58 together with the motor 36 and its mechanical drive may be connected to an upright angle plate 31 of a conventional type normally used on such machines. The auxiliary pattern 33 may be connected in the proper position as shown in Figs. 1, 2, and 3 and the bladed wheel machining operation may proceed. The machining attachment provides an arrangement whereby ordinary production machinery may be very readily and quickly converted to the production of bladed wheels and in this manner the versatility of a conventional die-sinking machine may be greatly increased. The simplicity of this machining attachment lies in the fact that the motor 36 synchronously rotates the work holding chuck and the master pattern, thereby controlling all of the motorized equipment for directional movements of the entire machine to which the attachment is connected. This arrangement clearly renders my attachment a very useful one, which is quite economical to build when compared with the cost of special machines designed solely for the purpose of producing skew bladed wheels.

I claim:

1. An attachment for producing skew bladed impeller wheels on a profiling machine, said profiling machine having motorized work-supporting carriage means capable of two degrees of motion in a horizontal plane, a motorized cutter-supporting carriage means capable of vertical motion, motor means for operating said cutter, a plurality of feelers, and switch means operated by said feelers to control said motorized carriage means in accordance with a plurality of patterns in contact with said feelers, said attachment comprising: an upright angle plate adapted to be secured to the horizontal work-supporting carriage means; a plurality of patterns carried by said angle plate in contact with said feelers; a rotating work piece supporting spindle carried by said angle plate; and means for rotating at least one of said patterns in synchronism with said spindle whereby said cutter in cooperation with the controlled motions of said carriage means generates the desired skew bladed impeller wheel.

2. An attachment for producing skew bladed impeller wheels on a profiling machine as described in claim 1 wherein, said work piece supporting spindle is rotated by motor means.

3. An attachment for producing skew bladed impeller wheels on a standard profiling machine as described in claim 1 in which a first auxiliary pattern is rigidly secured to said angle plate for controlling, in conjunction with a first one of said feelers, the motion of the horizontal work-supporting carriages in a direction parallel to the axis of said cutter; two other patterns carried by said angle plate for controlling, in conjunction with a second one of said feelers, the motion of the horizontal work-supporting carriage means in a direction normal to the axis of said cutter and the vertical motion of the cutter-supporting carriage means; a rotating work-piece supporting spindle carried by said angle plate; motor means carried by said angle plate for rotating said spindle; and means for rotating at least one of said two other patterns in synchronism with said spindle whereby said cutter in cooperation with the pattern controlled motions of said carriage means and the rotating work piece supporting spindle generates the desired skew bladed impeller wheel.

4. An attachment for producing skew bladed impeller wheels on a profiling machine as described in claim 1 in which a first auxiliary pattern is rigidly secured to said angle plate for controlling, in conjunction with a first one of said feelers, the motion of the horizontal work supporting carriage means in a direction parallel to the axis of said cutter; a master pattern rotatably carried by said angle plate; a second auxiliary pattern carried by said angle plate in fixed relationship to the axis of rotation of said master pattern; said master pattern and said second auxiliary pattern controlling, in conjunction with a second one of said feelers, the motion of the horizontal work-supporting carriages in a direction normal to the axis of the said cutter and the vertical motion of the said cutter supporting carriage means; a rotating work-piece supporting spindle carried by said angle plate; motor means carried by said angle plate for rotating said spindle; and means for rotating said master pattern in synchronism with said spindle whereby said cutter in cooperation with the pattern controlled motions of said carriage means and the rotating work piece supporting spindle generates the desired skew bladed impeller wheel.

5. An attachment for producing skew bladed impeller wheels as described in claim 4 wherein means are provided for adjusting the angular relationship of said work piece supporting spindle with the axis of said cutter.

6. An attachment for producing skew bladed impeller wheels as described in claim 4 wherein means are provided for adjusting the angular relationship of the axis of the said rotatable master pattern with the axis of said work piece supporting spindle whereby the axis of said rotatable master pattern may be maintained substantially parallel with the axis of said cutter.

7. An attachment for producing skew bladed impeller wheels as described in claim 4 wherein said rotatable master pattern, said second auxiliary pattern and said work-piece supporting spindle are carried by unitary means fixedly secured to said angle plate.

8. An attachment for producing skew bladed impeller wheels as described in claim 4 wherein means are provided for indexing said work piece on said work piece supporting spindle for generating a plurality of skew blades on said impeller wheel and means for returning said master pattern to its initial position.

9. An attachment for producing skew bladed impeller wheels on a profile milling machine having a work supporting carriage capable of two degrees of motion in the same plane and a motorized cutter capable of motion in a plane at right angles to said first plane, said attachment comprising, an upright angle plate adapted to be secured to said work supporting carriage, a work supporting spindle rotatably mounted on said angle plate, a first pattern rigidly secured to said angle plate, means for sensing the actuating surface of said first pattern to control the movement of said work supporting carriage in one direction, a second pattern rotatably mounted on said angle plate, means for synchronously rotating said work spindle and said second pattern, a third pattern rigidly secured to said angle plate so as to overlap a portion of said second pattern, means for simultaneously sensing the actuating surfaces of said second and third patterns to control the movement of said work supporting carriage in another direction and to move said cutter in a plane at right angles to the plane of motion of said work supporting carriage whereby said cutter will form skew blades on an impeller mounted on said work spindle.

10. A means for controlling two different degrees of motion of a profile milling machine comprising, a first cam rotatably mounted on said machine, a second cam secured to said machine so as to overlap a portion of said first cam, and means for simultaneously sensing the position of the actuating surfaces of said first and second cams as said first cam rotates to control at least two degrees of motion of said milling machine.

References Cited in the file of this patent

UNITED STATES PATENTS

| | | |
|---|---|---|
| 1,208,234 | Ternstedt | Dec. 12, 1916 |
| 2,335,455 | Scott | Nov. 30, 1943 |
| 2,424,031 | Heer | July 15, 1947 |
| 2,431,604 | Birmann | Nov. 25, 1947 |
| 2,471,097 | Dall et al. | May 24, 1949 |
| 2,585,920 | De Vlieg et al. | Feb. 19, 1952 |
| 2,674,160 | Martellotti | Apr. 6, 1954 |

FOREIGN PATENTS

| | | |
|---|---|---|
| 965,092 | France | Sept. 1, 1950 |